3,772,376
X-RAY CONTRAST AGENTS
Torsten Karl Ivar Bernhard Ekstrand, Norrkoping, Sweden, Asger Munksgaard, Soborg, Denmark, and Alvin Ronlan and Borje Vilhelm Wickberg, Lund, Sweden, assignors to Erco Lakemedel AB, Stockholm, Sweden
No Drawing. Filed Mar. 12, 1971, Ser. No. 123,904
Claims priority, application Sweden, Mar. 12, 1970, 3,267/70, 3,268/70; Mar. 31, 1970, 4,323/70
Int. Cl. C07c 103/32
U.S. Cl. 260—518 A          1 Claim

ABSTRACT OF THE DISCLOSURE

The invention provides X-ray contrast agents and compositions containing them. The new agents of the invention are compounds of the formula:

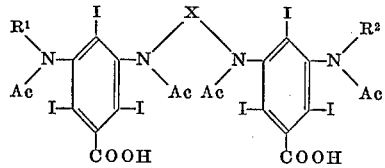

or a salt thereof with a physiologically acceptable organic or inorganic base, wherein $R^1$ is a hydrogen atom or an alkyl group containing up to three carbon atoms which may be substituted by one or two hydroxy groups; $R^2$ is a hydrogen atom, an alkyl group containing up to three carbon atoms which may be substituted by one or two hydroxy groups, or a group of the formula:

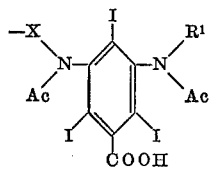

Ac is an acetyl or propionyl group; and X is an alkylene group containing from 3 to 6 carbon atoms.

---

According to the invention, therefore, there are provided as new compounds, compounds of the formula:

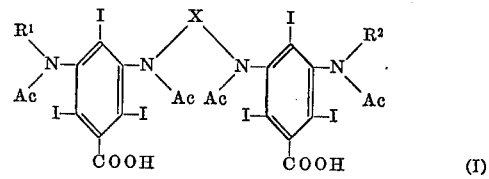

in which $R^1$ is a hydrogen atom or an alkyl group containing up to 3 carbon atoms, which alkyl group may be substituted by one or two hydroxy groups; $R^2$ is a hydrogen atom, an alkyl group containing up to three carbon atoms which may be substituted by one or two hydroxy groups, or a group of the formula:

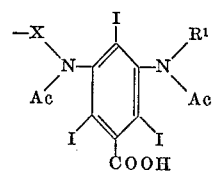

Ac is an acetyl or propionyl group; and X is an alkylene group containing from 3 to 6 carbon atoms; and salts thereof with a physically acceptable organic or inorganic base.

Examples of compounds of Formula I in which $R^2$ is other than a group:

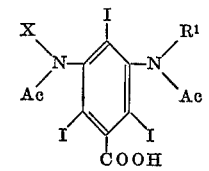

and which show good radio-opaque activity are listed in Table 1.

TABLE 1.—COMPOUNDS OF FORMULA I

| Compound | $R^1$ | $R^2$ | Ac | X | M.P., °C |
|---|---|---|---|---|---|
| 1 | CH$_3$ | CH$_3$ | CH$_3$CO | CH$_2$CH$_2$CH$_2$CH$_2$ | 250–53 |
| 2 | CH$_3$ | CH$_3$ | CH$_3$CO | CH$_2$CH$_2$CH$_2$CH$_2$CH$_2$ | 237–40 |
| 3 | CH$_3$ | CH$_3$ | CH$_3$CO | CH$_2$CH$_2$CH$_2$CH$_2$CH$_2$CH$_2$ | 241–45 |
| 4 | H | H | CH$_3$CH$_2$CO | CH$_2$CH$_2$CH$_2$ | 251–55 |
| 5 | C$_2$H$_5$ | H | CH$_3$CO | CH$_2$CH$_2$CH$_2$CH$_2$ | 252–56 |
| 6 | H | CH$_3$ | CH$_3$CO | CH$_2$CH$_2$CH$_2$CH$_2$ | 246–49 |
| 7 | H | H | CH$_3$CO | CH$_2$CH$_2$CH$_2$ | 242–48 |
| 8 | H | H | CH$_3$CO | CH$_2$CH$_2$CH$_2$CH$_2$ | 240–45 |
| 9 | H | H | CH$_3$CO | CH$_2$CH$_2$CH$_2$CH$_2$ | 240–44 |
| 10 | H | H | CH$_3$CO | CH$_2$CH$_2$CH$_2$CH$_2$ | 240–44 |
| 11 | CH$_2$CH$_2$OH | CH$_2$CH$_2$OH | CH$_3$CO | CH$_2$CH$_2$CH$_2$ | 288–90 |
| 12 | CH$_2$CH$_2$OH | CH$_3$ | CH$_3$CO | CH$_2$CH$_2$CH$_2$CH$_2$ | 247–49 |

This invention is concerned with improvements in and relating to new di- and tri- (triodobenzene) derivatives, the preparation thereof, and compositions containing them.

It has now been found, in accordance with the present invention, that certain di- and tri-(triodobenzene) derivatives, as hereinafter defined may be used as radio-opaque or X-ray contrast agents.

Examples of compounds of Formula I, in which $R^2$ is a group

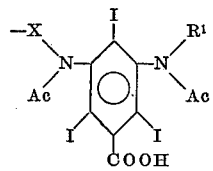

which may be represented by Formula II below, and having good properties as radiopaque agents, are listed in Table 2.

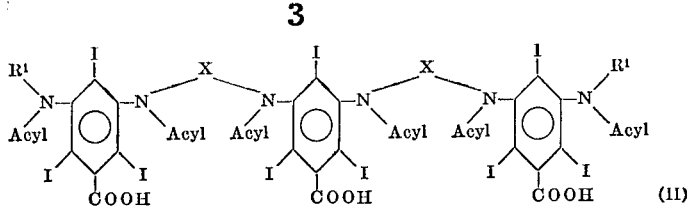

(II)

TABLE 2.—COMPOUNDS OF FORMULA II

| Compound | R¹ | Acyl | X | M.P., °C. |
|---|---|---|---|---|
| 15 | CH₃ | CH₃CO | CH₂CH₂CH₂CH₂ | 250-55 |
| 16 | C₂H₅ | CH₃CO | CH₂CH₂CH₂CH₂ | |
| 17 | H | CH₃CO | CH₂CH₂CH₂CH₂ | 255-57 |
| 18 | CH₂CH₂OH | CH₃CO | CH₂CH₂CH₂CH₂ | |

The compounds of Formula I and functional derivatives thereof in accordance with the invention are useful as contrast agents in X-ray diagnosis from the point of view of their solubility, very good compatibility and low toxicity. When water-soluble products are desired the free carboxylic acids may be used in the form of water-soluble, nontoxic salts with inorganic or organic basis.

Different compounds of Formula I may be used in different forms of X-ray diagnosis. Their rheological properties make them particularly valuable in various forms of angiography. Furthermore, their fast renal excretion make them suitable as contrast agents for investigating the kidneys and the urinary tract.

The contrast agents may be administered as solutions or dispersions in water, using solvents and carriers known per se, and the invention further provides a radio-opaque composition comprising a compound of Formula I or salt thereof in association with a carrier or diluent.

A suitable form for the administration of the compounds of the invention as X-ray contrast agents is as an aqueous solution of a salt thereof. Sodium, methylglucamine and diethanolamine salts have been used with excellent results. The salt may be prepared by adding the dicarboxylic of Formula I to an aqueous solution of the base.

The new compounds of Formula I may be prepared by reacting a 3,5-diamino-2,4,6-triiodo-benzoic acid derivative of the formula:

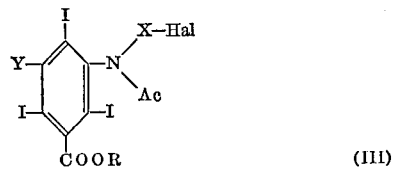

(III)

or

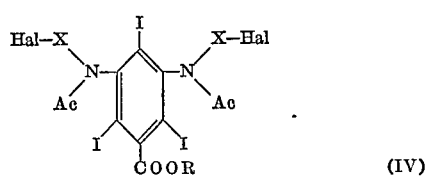

(IV)

in which X and Ac have the meanings defined above, R is a readily hydrolysable group (e.g. a methyl or benzyl group), Hal is a halogen atom (preferably a chlorine or bromine atom) and Y is an amino group or a group:

in which R³ is a hydrogen atom or an alkyl group containing up to three carbon atoms; with a 3,5-diamino-2,4,6-triiodo-benzoic acid derivative of the formula:

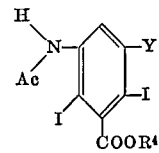

(V)

in which Ac and Y have the meanings defined above and R⁴ is a hydrogen atom or a readily hydrolysable group to yield a compound of the formula:

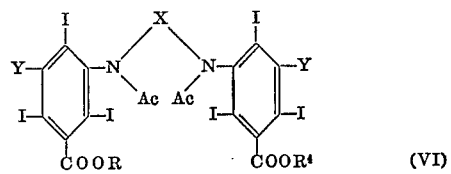

(VI)

(when reacting a compound of Formula III with a compound of Formula V), or

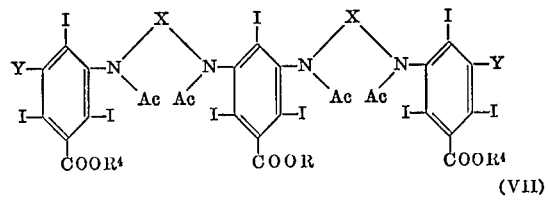

(VII)

(when reacting a compound of Formula IV with a compound of Formula V) and thereafter, if desired, acylating the free amino groups (if any), and alkylating or hydroxyalkylating the acylamino groups and hydrolysing off the group R and R⁴.

The reaction between the compound of Formula III or Formula IV is suitably carried out in the presence of a solvent and dimethylformamide is a preferred solvent but other solvents such as acetone or methyl ethyl ketone may also be used. The reaction may be carried out in the presence of a condensing agent such as sodium hydride or sodium hydroxide and the progress of the reaction may be followed by thin layer chromatography. Chromatography, either paper or thin layer chromatography is very suitable for controlling the purity of the desired end products. The compounds of Formulae III and V are conveniently reacted together in substantially equimolar proportions whilst the compounds of Formulae IV and V are suitably reacted in a mole ratio of about 1:2.

The compounds of Formula III used in the preparation of new compounds of the invention may be prepared by reacting a compound of the formula:

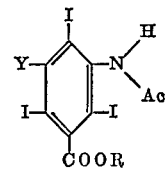

(VIII)

in which R, Ac and Y have the meanings defined above, with a dihalo compound of the formula:

Hal—X—Hal in which Hal and X have the meanings defined above, for example 1,3-dichloropropane, 1,3-dibromopropane, 1,4-dibromobutane, 1,5-dibromopentane and 1,6-dibromohexane. Two moles of the compound of Formula VIII may be directly reacted with one mole of the dihalo compound to give a compound of Formula VI.

The compounds of Formula IV used in the preparation of the new compounds of the invention may be prepared by reacting a compound of the formula:

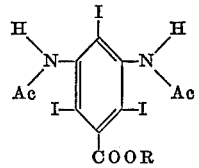

(IX)

with a dihalo compound of the formula:

Hal—X—Hal

In order that the invention may be well understood, the following examples are given by way of illustration only. The compounds were identified by the method of preparation as well as by analysis and NMR-spectrography.

EXAMPLE 1

Preparation of the compound of Formula III in which R=methyl, Y=N-methyl acetamido, X=—CH$_2$CH$_2$CH$_2$—Hal=Br 64.2 g. (0.1 mol) of methyl N-methyl-3,5-diacetamido-2,4,6-triiodobenzoate, 5.0 g. (0.1 mol) of sodium hydride (50% emulsion oil) and 200 ml. of dimethylformamide are stirred at about 25° C. until a clear solution is obtained. 26.0 g. (0.12 mol) 1,4-dibromobutane is added to the solution and the reaction mixture is stirred for one hour at 25° C. and then poured into water. The resulting precipitate is collected, washed with water and dried. Yield 70 g. After treatment with ethanol the compound melts at 159–163° C.

By using the corresponding ethyl and benzyl esters, these are obtained in which R is ethyl (M.P. 122–126° C.) and benzyl (M.P. 183–185° C.).

By reacting methyl N-methyl-3,5-diacetamido-2,4,6-triiodobenzoate with 1,3-dibromopropane in an analogous manner methyl N-(3'-bromopropyl)-N'-methyl-3,5-diacetamido- 2,4,6-triiodobenzoate (M.P. 168–170° C.) is obtained. The corresponding benzyl (M.P. 187–190° C.) and ethyl (M.P. 107–117° C.) esters may be obtained in an analogous manner.

By using 1,5-dibromopentane, esters of N-(5'-bromopentyl) - N' - methyl-3,5-diacetamido-2,4,6-triiodobenzoic acid are obtained. Methyl ester M.P. 184–188° C., benzyl ester M.P. 120–128° C.

Methyl N-(4'-bromobutyl(-N'-ethyl-3,5-diacetamido-2,4,6-triiodobenzoate (M.P. 168–176° C.) and methyl 3-methylacetamido-5-(4'-bromobutyl)-propionamido-2, 4,6-triiodobenzoate (M.P. 133–137° C.) are prepared in an analogous manner.

EXAMPLE 2

Preparation of a compound of Formula III, in which Y=—NH$_2$ 59.0 g. (0.1 mol) of methyl 3-acetamido-5-amino-2,4,6-triiodobenzoate and 26.0 g. (0.12 mol) of 1,4-dibromobutane are dissolved with stirring at room temperature in 200 ml. of dimethylformamide. 50 ml. (0.1 mol) of 2 N sodium hydroxide is added to the solution and the reaction mixture is stirred at 25° C. until the reaction is complete. The reaction mixture is then poured into water and the resulting precipitate is collected and washed with water. After treatment with ether the resulting methyl 3 - (N - 4'-bromobutyl)-acetamido-5-amino-2,4,6-triiodobenzoate melts at 170–175° C.

In an analogous manner starting materials of Formula VIII as listed in Table 3 may be used.

TABLE 3

Starting material of Formula VIII

TABLE 3—STARTING MATERIAL OF FORMULA VIII

| R | Acyl | Y |
|---|---|---|
| CH$_3$ | CH$_3$CO | CH$_3$CON(CH$_3$)— |
| CH$_3$ | CH$_3$CH$_2$CO | CH$_3$CON(CH$_3$)— |
| CH$_3$ | CH$_3$CO | CH$_3$CON(C$_2$H$_5$)— |
| C$_6$H$_5$CH$_2$ | CH$_3$CO | CH$_3$CON(CH$_3$)— |
| CH$_3$ | CH$_3$CO | CH$_3$CH$_2$CON(CH$_3$)— |
| C$_2$H$_5$ | CH$_3$CO | CH$_3$CON(CH$_3$)— |
| CH$_3$ | CH$_3$CO | NH$_2$— |

EXAMPLE 3

62.8 g. (0.1 mol) of methyl 3,5-diacetamido-2,4,6-triiodobenzoate, 10.0 g. (0.2 mol) sodium hydride (50% emulsion in oil) and 250 ml. of dimethylformamide are stirred at about 25° C. until a clear solution is obtained. This solution is dropped into a mixture of 51.4 g. (0.24 mol) of 1,4-dibromobutane and 250 ml. of dimethylformamide at such a rate that the temperature of the mixture is kept at about 25° C. Stirring is maintained overnight at room temperature. Part of the solvent is then removed by distillation and the residue is poured into water. The resulting crystals are collected, washed with water and dried. Yield 84 g. After treatment with ethanol the resulting compound, methyl N,N' - di - (4'-bromobutyl)-3,5-diacetamido-2,4,6-triiodobenzoate melts at 135–140° C.

8.0 g. of sodium hydroxide, dissolved in 16 ml. of water, may be used instead of sodium hydride.

The corresponding ethyl (M.P. 185–190° C.) and benzyl (M.P. 120–125° C.) esters may be prepared in an analogous manner.

In an analogous manner the methyl (M.P. 122–125° C.) and benzyl (M.P. 144–147° C.) N,N'-di-(4'-bromobutyl)-3,5-dipropionamido-2,4,6-triiodobenzoates are prepared.

By using 1,5-dibromopentane methyl N,N'-di(5'-bromopentyl) - 3,5-diacetamido-2,4,6-triiodo-benzoate (M.P. 180–190° C.) is obtained.

From 1,6 - dibromohexane methyl N,N'-di-(6'-bromohexyl)-3,5-diacetamido-2,4,6-triiodobenzoate (M.P. 165–180° C.) is obtained.

Suitable starting materials of Formula IX are listed in Table 4.

TABLE 4.—STARTING MATERIALS OF FORMULA IX

| R: | Ac |
|---|---|
| CH$_3$ | CH$_3$CO |
| CH$_3$ | CH$_3$CH$_3$CO |
| C$_6$H$_5$CH$_2$ | CH$_3$CO |

Suitable dihalo compounds are 1,3-dichloropropane, 1,3-dibromopropane, 1,4-dibromobutane, 1,5-dibromopentane and 1,6-dibromohexane.

EXAMPLE 4

6.42 g. (0.01 mol) of methyl N-methyl-3,5-diacetamido-2,4,6-triiodobenzoate and 0.25 g. (0.01 mol) of sodium hydride are stirred in 25 ml. of dimethyl formamide until a clear solution is obtained. 7.75 g. (0.01 mol) of methyl N-(4'-bromobutyl)-N-methyl - 3,5 - diacetamido-2,4,6-triiodobenzoate is added to the clear solution with stirring. The stirring is continued overnight, and the reaction mixture is poured into water. The separated precipitate is collected and washed with water. The resulting methyl ester melts at 235–240° C. Hydrolysis yields the corresponding free acid (compound No. 1, Table 1) having a melting point of 250–253° C.

Starting from methyl or benzyl 3-acetamido-5-amino-2,4,6-triiodobenzoate and methyl N-(4'-bromobutyl)N'-methyl-3,5-diacetamido-2,4,6-triiodobenzoate it is possible to obtain the corresponding dimeric ester, which after acetylation with acetic anhydride and hydrolysis to remove the methyl or benzyl groups gives compound No. 6 in Table 1.

If the acylation is carried out using propionic anhydride instead of acetic anhydride a corresponding asymmetric dimeric compound, containing three acetyl groups and one priopionyl group, is obtained. M.P. of the free acid (compound No. 14) 240–248° C.

Hydroxyalkylation of the compounds may readily be performed by reaction with an epoxide or a haloalkanol. For instance the compound No. 7 in Table 1 reacts with 2-chloroethanol to give compound No. 11. Similarly compound No. 6 may be reacted with 2-chloroethanol to give compound No. 12.

2 moles of a monomeric compound of Formula VIII may be reacted with 1 mol of dihalo compound, and in this case the free acids may be used. Thus, for instance, compound No. 1, Table 1, may be prepared from 2 mol of N-methyl-3,5-diacetamido-2,4,6-triiodobenzoic acid and 1 mol of 1,4-dibromobutane. The compound so obtained is identical with the compound prepared as stated above.

Compound No. 7, Table 1 may be prepared by reacting 2 mol of 3-acetamido-5-amino-2,4,6-triiodobenzoic acid with 1 mol 1,3-dibromopropane and acetylation of the resulting dimeric acid with acetic anhydride.

Using propionic anhydride instead of acetic anhydride a corresponding symmetrical dimeric compound, containing two acetyl groups and two propionyl groups, is obtained. M.P. of the free acid (compound No. 13) 259–262° C.

Compound No. 7 as listed below may also suitably be prepared from an excess of 3,5-diacetamido-2,4,6-triiodobenzoic acid and 1,3-dibromopropane.

EXAMPLE 5

25.7 g. (0.04 mol) of methyl N-methyl-3,5-diacetamido-2,4,6-triiodobenzoate, 1.0 g. (0.04 mol) sodium hydride and 75 ml. of dimethylformamide are stirred at 25° C. until a clear solution is obtained. To this solution 18.0 g. (0.02 mol) of methyl N,N'-bis-(4'-bromobutyl)-3,5 - diacetamido - 2,4,6 - triiodobenzoate is added with stirring, and the reaction mixture is stirred overnight at room temperature. The solvent is removed by distillation and the residue treated with water and methyl ethyl ketone. The resulting compound melts at 205–215° C. The corresponding free acid is obtained after hydrolysis. The free acid is listed as compound No. 15 in Table 2.

A number of compounds according to the invention of Formula I have been tested regarding their usefulness as contrast agents in arteriography and angio-cardiography as well as in intravenous urography. The compounds have been tested in animal experiments with regard to toxicity, compatibility, blood pressure effect and haemolytic properties. Compounds having good properties in these respect are listed in Tables 1 and 2 above.

EXAMPLE 6

Preparation of a solution for injection containing 300 mg. iodine/ml.

51.608 g. of compound No. 1, Table 1, 0.610 g. of methylglucamine and 0.020 g. of Na-Ca-EDTA are suspended in a mixture of 50 ml. of sterile water and 0.9 ml. of 0.25 N ammonia. 10 N sodium hydroxide is added to adjust the pH 7.4 with stirring and stirring is continued until a clear solution is obtained. The solution is then diluted to 100.0 ml. and filtered on a sterilising filter.

Injection solutions, containing salts of other contrast agents of the invention may be prepared in an analogous manner. It is, of course, possible to prepare solutions having iodine concentrations other than 300 mg./ml. The amount of iodine-containing contrast agent to be used is easily calculated. It is possible to prepare injection solutions, containing salts of other physiologically inert organic or inorganic bases, and it is also possible for a person skilled in the art to prepare solutions, containing salts of different inert bases as well as so-called balanced injection solutions.

We claim:
1. A compound selected from compounds of the formula:

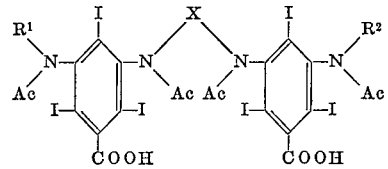

and salts thereof with physiologically acceptable organic or inorganic bases, wherein $R^1$ is a hydrogen atom or an alkyl group containing up to three carbon atoms which may be substituted by a hydroxy group; $R^2$ is a hydrogen atom, an alkyl group containing up to three carbon atoms which may be substituted by a hydroxy group, or a group of the formula:

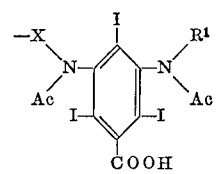

Ac is an acetyl or propionyl group; and X is an alkylene group containing from 3 to 6 carbon atoms.

References Cited

Finar, I. L.: Organic Chemistry, vol. I (1963), pub. by Richard Clay & Co., Inc. England (QP251F6) p. 312 relied on.

LORRAINE A. WEINBERGER, Primary Examiner

L. A. THAXTON, Assistant Examiner

U.S. Cl. X.R.

260—471 R, 501.11, 519; 424—5